United States Patent
Rylander et al.

(10) Patent No.: US 11,877,527 B2
(45) Date of Patent: Jan. 23, 2024

(54) SYSTEM AND METHOD FOR CONTROLLING AGRICULTURAL IMPLEMENTS BASED ON FIELD MATERIAL CLOUD CHARACTERISTICS

(71) Applicant: CNH Industrial America LLC, New Holland, PA (US)

(72) Inventors: Douglas James Rylander, La Salle, IL (US); Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 775 days.

(21) Appl. No.: 16/655,655

(22) Filed: Oct. 17, 2019

(65) Prior Publication Data
US 2021/0112697 A1    Apr. 22, 2021

(51) Int. Cl.
| | |
|---|---|
| *A01B 63/00* | (2006.01) |
| *A01B 79/00* | (2006.01) |
| *A01B 63/32* | (2006.01) |
| *B60K 31/00* | (2006.01) |
| *G01N 15/02* | (2006.01) |
| *G01N 15/00* | (2006.01) |
| *A01B 49/02* | (2006.01) |

(52) U.S. Cl.
CPC ............ *A01B 79/005* (2013.01); *A01B 63/32* (2013.01); *B60K 31/00* (2013.01); *G01N 15/0227* (2013.01); *A01B 49/02* (2013.01); *B60Y 2200/221* (2013.01); *G01N 2015/0003* (2013.01); *G01N 2015/0046* (2013.01); *G01N 2015/0294* (2013.01)

(58) Field of Classification Search
CPC ......... A01B 67/00; A01B 63/28; A01B 63/32; A01B 79/005; G01N 2033/245; G01N 33/24; G01N 21/3563; G01N 21/359; G01N 15/0227; B60K 31/00
USPC .............. 356/335–343, 237.1–237.5; 701/50
See application file for complete search history.

(56) References Cited

U.S. PATENT DOCUMENTS

| | | | |
|---|---|---|---|
| 8,666,570 B1 * | 3/2014 | Tillotson ................ | B64D 45/00 |
| | | | 701/28 |
| 8,849,523 B1 | 9/2014 | Chan et al. | |
| 8,862,339 B2 | 10/2014 | Henry et al. | |
| 9,282,688 B2 * | 3/2016 | Casper ................. | A01B 17/002 |
| 9,285,501 B2 | 3/2016 | Christy et al. | |

(Continued)

FOREIGN PATENT DOCUMENTS

WO    WO2012102667    8/2012

*Primary Examiner* — Hoa Q Pham
(74) *Attorney, Agent, or Firm* — Rebecca L. Henkel; Rickard K. DeMille

(57) ABSTRACT

In one aspect, a system for controlling the operation of an agricultural implement may include a ground-engaging tool configured to engage soil within a field such that the tool creates a field material cloud aft of the tool as the implement is moved across the field. Furthermore, the system may include an imaging device configured to capture image data associated with the field material cloud created by the ground-engaging tool. Moreover, a controller of the disclosed system may be configured to identify a plurality of field material units within the field material cloud based on the image data captured by the imaging device. Additionally, the controller may be configured to determine a characteristic associated with the identified plurality of field material units.

20 Claims, 5 Drawing Sheets

(56) References Cited

U.S. PATENT DOCUMENTS

| | | |
|---|---|---|
| 9,516,802 B2 | 12/2016 | Zemenchik |
| 9,668,399 B2 | 6/2017 | Gates |
| 10,028,424 B2 | 7/2018 | Zemenchik et al. |
| 10,123,475 B2 | 11/2018 | Posselius et al. |
| 10,877,150 B2* | 12/2020 | Badin .................... G01S 13/95 |
| 2007/0125558 A1* | 6/2007 | Embry .................. B08B 17/00 |
| | | 172/66 |
| 2016/0029547 A1 | 2/2016 | Casper et al. |
| 2017/0064900 A1 | 3/2017 | Zemenchik |
| 2017/0112043 A1* | 4/2017 | Nair ...................... G05B 15/02 |
| 2017/0144748 A1* | 5/2017 | Mayo .................... B64C 13/506 |
| 2018/0098495 A1 | 4/2018 | Van Meurs |
| 2018/0128933 A1 | 5/2018 | Koch et al. |
| 2018/0206393 A1 | 7/2018 | Stoller et al. |
| 2018/0220577 A1* | 8/2018 | Posselius ............. A01B 79/005 |
| 2018/0336410 A1 | 11/2018 | Posselius |
| 2018/0338422 A1* | 11/2018 | Brubaker ........... A01D 41/1208 |
| 2019/0343032 A1* | 11/2019 | Stanhope ................ A01B 76/00 |
| 2021/0123728 A1* | 4/2021 | Smith .................... A01B 63/24 |

* cited by examiner

SYSTEM AND METHOD FOR CONTROLLING AGRICULTURAL IMPLEMENTS BASED ON FIELD MATERIAL CLOUD CHARACTERISTICS

FIELD OF THE INVENTION

The present disclosure generally relates to agricultural implements and, more particularly, to systems and methods for controlling the operation of an agricultural implement based on one or more characteristics of a field material cloud generated by a ground-engaging tool of the implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground-engaging tools, such as harrow disks, shanks, leveling blades, tines, rolling baskets, and/or the like, which loosen and/or otherwise agitate the soil to prepare the soil for subsequent planting operations.

When performing tillage operations, it is desirable to create a level and uniform layer of tilled soil across the field to form a proper seedbed for subsequent planting operations. As such, it may be necessary to adjust the operation of the agricultural implement as soil conditions vary across the field. In this respect, systems have been developed to automatically adjust an operating parameter of the agricultural implement based on a change in a field condition. However, further improvements to such systems are needed.

Accordingly, an improved system and method for controlling the operation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of an agricultural implement. The system may include a ground-engaging tool configured to engage soil within a field such that the ground-engaging tool creates a field material cloud aft of the ground-engaging tool as the agricultural implement is moved across the field. Furthermore, the system may include an imaging device configured to capture image data associated with the field material cloud created by the ground-engaging tool. Additionally, the system may include a controller communicatively coupled to the imaging device, with the controller including a processor and associated memory. As such, the memory may store instructions that, when implemented by the processor, configure the controller to identify a plurality of field material units within the field material cloud based on the image data captured by the imaging device and determine a characteristic associated with the identified plurality of field material units.

In another aspect, the present subject matter is directed to a method for controlling the operation of an agricultural implement. The agricultural implement may include a ground-engaging tool configured to engage soil within a field as the agricultural implement is moved across the field. The method may include receiving, with one or more computing devices, image data associated with a field material cloud created by the ground-engaging tool as the ground-engaging tool is moved through the soil. Furthermore, the method may include identifying, with the one or more computing devices, a plurality of field material units within the field material cloud based on the received image data. Moreover, the method may include determining, with the one or more computing devices, a characteristic associated with the identified plurality of field material units. Additionally, the method may include controlling, with the one or more computing devices, an operation of the agricultural implement based on the determined characteristic.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which refers to the appended figures, in which.

Figure 1:
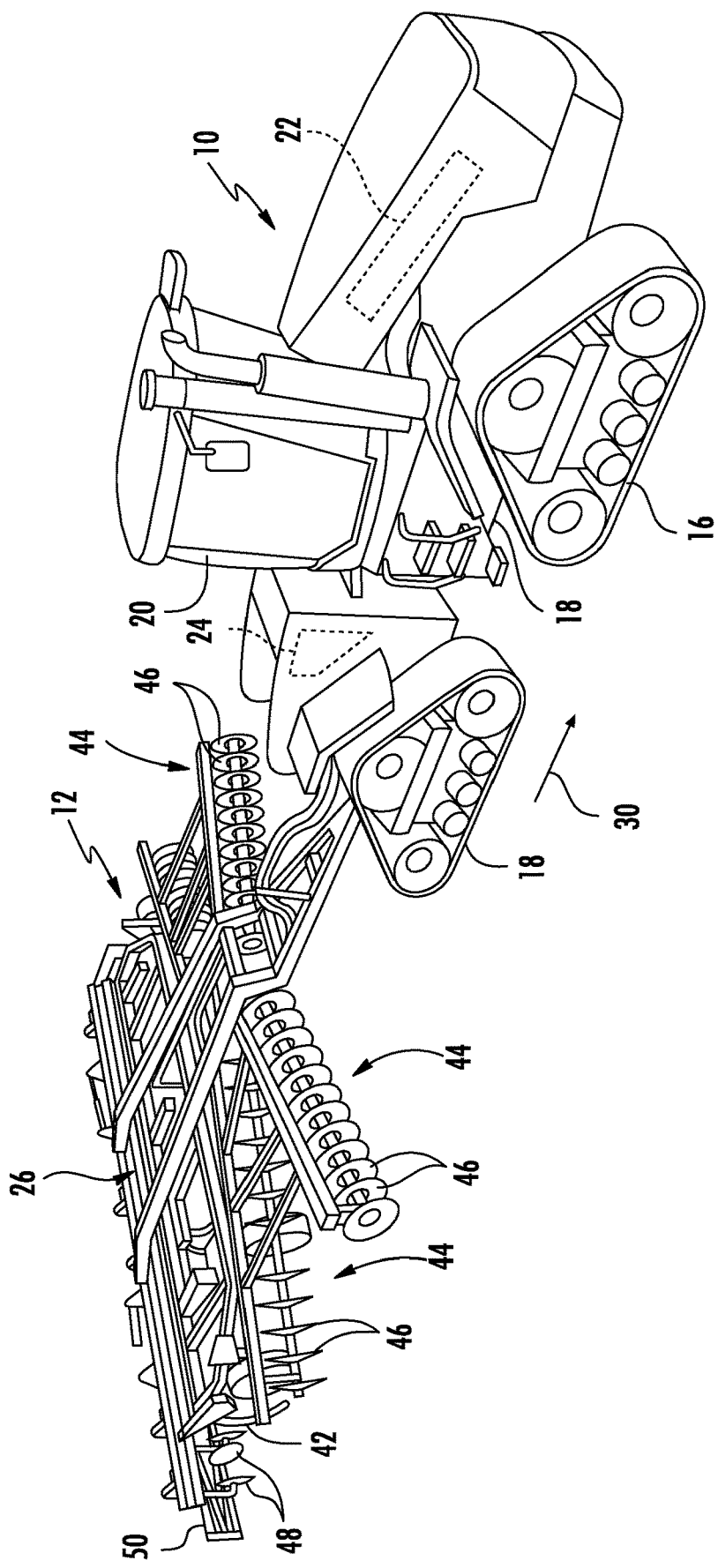
FIG. 1 illustrates a perspective view of one embodiment of a work vehicle towing an implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of an agricultural implement being towed across a field by a work vehicle. Specifically, in several embodiments, the implement may include one or more ground-engaging tools (e.g., a disk blade(s)) mounted thereon. In this respect, as the vehicle/implement travels across the field to perform an agricultural operation (e.g., a tillage operation) thereon, the ground-engaging tool(s) may be configured to engage the soil in a manner that generates one or more field material clouds (informally known as a rooster tail(s)) aft the tool(s). One or more characteristics of the field material cloud(s) may, in turn, be indicative of the performance of the agricultural operation. As such, the vehicle and/or implement may include one or more imaging devices (e.g., a camera(s), a LIDAR sensor(s), a RADAR sensor(s), and/or the like) mounted thereon. Such imaging device(s) may, in turn, be configured to capture image data or image-like data associated with the field material cloud(s).

In accordance with aspects of the present disclosure, a controller of the disclosed system may be configured to control the operation of the implement based on one or more characteristics of the field material cloud(s). Specifically, in several embodiments, the controller may be configured to process/analyze the received image data to identify a plurality of field material units (e.g., soil clods, residue pieces, rocks, and/or the like) of the field material cloud(s) depicted in the image data. Furthermore, the controller may be configured to determine one or more characteristics (e.g., the velocity, the direction of travel, the size, the shape, and/or the like) of the identified field material units. Thereafter, the controller may be configured to adjust one or more operating parameters of the vehicle and/or implement based on the determined characteristic(s) of the field material units. For example, in one embodiment, the controller may be configured to initiate an adjustment to the ground speed of the implement and/or the penetration depth of, angle/orientation of, and/or the force being applied to ground-engaging tool(s) of the implement when the determined characteristic(s) falls outside of an associated predetermined range.

Figure 2:
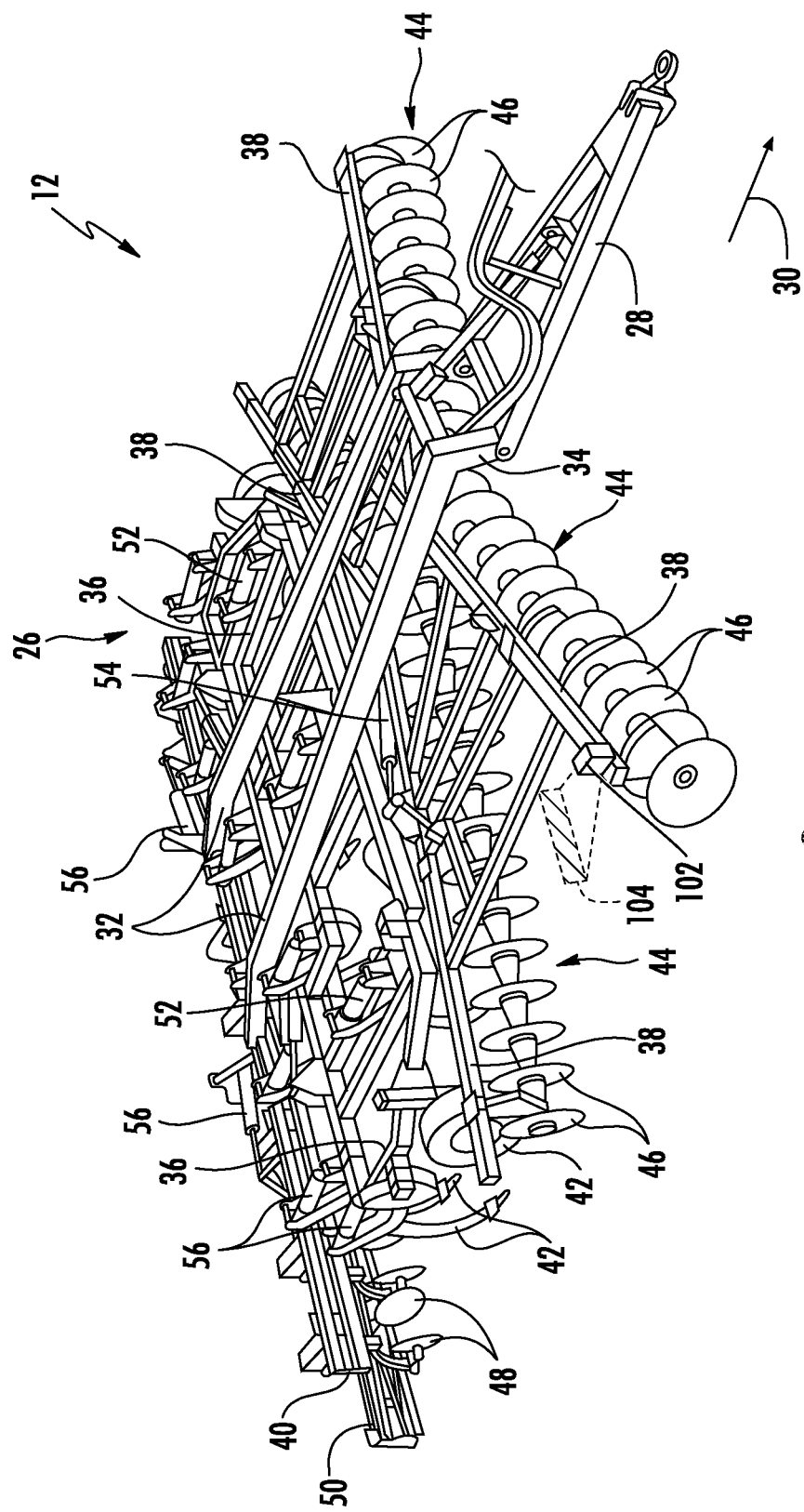
FIG. 2 illustrates a perspective view of the implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor and the implement 12 is configured as a tillage implement. However, in other embodiments, the work vehicle 10 may be configured as any other suitable agricultural vehicle. Furthermore, in alternative embodiments, the implement 12 may be configured as any other suitable agricultural implement.

As particularly shown in FIG. 1, the work vehicle 10 includes a pair of front track assemblies 14 (one is shown), a pair of rear track assemblies 16 (one is shown), and a frame or chassis 18 coupled to and supported by the track assemblies 14, 16. An operator's cab 20 may be supported by a portion of the chassis 18 and may house various input devices (e.g., a user interface) for permitting an operator to control the operation of one or more components of the work vehicle 10 and/or one or more components of the implement 12. Additionally, the work vehicle 10 may include an engine 22 and a transmission 24 mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Moreover, as shown in FIGS. 1 and 2, the implement 12 may generally include a carriage frame assembly 26 configured to be towed by the work vehicle 10 via a pull hitch or tow bar 28 in a travel direction of the vehicle (e.g., as indicated by arrow 30). In general, the carriage frame assembly 26 may be configured to support a plurality of ground-engaging tools, such as a plurality of shanks, disk blades, leveling blades, basket assemblies, and/or the like. In several embodiments, the various ground-engaging tools may be configured to engage the soil within the field across which the implement 12 is being towed, thereby performing a tillage operation on the field.

As particularly shown in FIG. 2, the carriage frame assembly 26 may include aft-extending carrier frame members 32 coupled to the tow bar 28. In addition, reinforcing gusset plates 34 may be used to strengthen the connection between the tow bar 28 and the carrier frame members 32. In several embodiments, the carriage frame assembly 26 may generally support a central frame 36, a forward frame 38 positioned forward of the central frame 36 in the direction of travel 30, and an aft frame 40 positioned aft of the central frame 36 in the direction of travel 30. As shown in FIG. 2, in one embodiment, the central frame 36 may correspond to a shank frame configured to support a plurality of ground-engaging shanks 42 configured to till the soil as the implement 12 is towed across the field. However, in other embodiments, the central frame 36 may be configured to support any other suitable ground-engaging tools.

Additionally, as shown in FIG. 2, in one embodiment, the forward frame 38 may correspond to a disk frame configured to support various gangs or sets 44 of disk blades 46. In such an embodiment, each disk blade 46 may, for example, include both a concave side (not shown) and a convex side (not shown). In addition, the various gangs 44 of disk blades 46 may be oriented at an angle relative to the travel direction 30 of the work vehicle 10 to promote more effective tilling of the soil. As will be described below, when the implement 12 is towed across the field to perform an agricultural operation thereon, one or more of the disk blades 46 (e.g., the laterally outermost disk blade 46 of each gang 44) may generate a field material cloud (often referred to informally as a "rooster tail") aft of the disk blade(s) 46 as the implement 12 is towed across the field. However, in other embodiments, the forward frame 38 may be configured to support any other suitable ground-engaging tools.

Moreover, like the central and forward frames 38, 38, the aft frame 40 may also be configured to support a plurality of ground-engaging tools. For instance, in the illustrated embodiment, the aft frame 40 is configured to support a plurality of leveling blades 48 and rolling (or crumbler) basket assemblies 50 positioned aft of the shanks 42. However, in other embodiments, any other suitable ground-engaging tools may be coupled to and supported by the aft frame 44, such as a plurality closing disks.

In addition, the implement 12 may also include any number of suitable actuators (e.g., hydraulic cylinders) for adjusting the relative positioning of, penetration depth of, and/or force applied to the various ground-engaging tools 42, 46, 48, 50. For instance, the implement 12 may include one or more first actuators 52 coupled to the central frame 36 for raising or lowering the central frame 36 relative to the ground, thereby allowing adjustment of the penetration depth of and/or the forced applied to the shanks 42. Similarly, the implement 12 may include one or more second actuators 54 coupled to the forward frame 38 to adjust the penetration depth of, the angle/orientation of, and/or the force applied to the disk blades 46. Moreover, the implement 12 may include one or more third actuators 56 coupled to the aft frame 40 to allow the aft frame 40 to be moved relative to the central frame 36, thereby allowing the relevant operating parameters of the ground-engaging tools 48, 50 supported by the aft frame 40 (e.g., the force applied to and/or the penetration depth of) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10 or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing closing disks on the aft frame 40 of the implement 12.

Additionally, in accordance with aspects of the present subject matter, the vehicle 10 and/or the implement 12 may include one or more imaging devices 102 coupled thereto and/or supported thereon for capturing image data associated with the field as an agricultural operation (e.g., a tillage operation) is being performed via the implement 12. As described above, the implement 12 may include various ground-engaging tools for performing an agricultural operation on the field. In this respect, as the implement 12 is towed across the field to perform the agricultural operation, one or more of the ground-engaging tools (e.g., one or more of the disk blades 46) may generate a field material cloud(s) aft of the tool(s). One or more cloud characteristics of field material cloud(s) may, in turn, be indicative of the performance of the agricultural operation. As such, in several embodiments, the imaging device(s) 102 may be provided in operative association with the vehicle 10 and/or the implement 12 such that the imaging device(s) 102 has a field of view (e.g., as indicated by dashed lines 104 in FIG. 2) directed towards a portion(s) of the field disposed aft of one or more ground-engaging tools of the implement 12. As such, the imaging device(s) 102 may capture image data associated with the field material cloud(s) being generated by the ground-engaging tools.

In general, the imaging device(s) 102 may correspond to any suitable non-contact-based sensing device(s) configured to capture image data or image-like data associated with the field material cloud(s) that allows the field material units (e.g., soil clods, residue pieces, and/or the like) within the field material cloud(s) to be identified and tracked. For example, in several embodiments, the imaging device(s) 102 may correspond to a suitable camera(s). Specifically, in such embodiments, the imaging device(s) 102 may be configured to capture two-dimensional images of the field material cloud(s), thereby allowing the field material units therein to be identified and subsequently tracked by analyzing the content of each image. For instance, in a one embodiment, the imaging device(s) 102 may correspond to a monocular camera(s) having a single lens with an associated image sensor to allow the camera(s) to capture or two-dimensional images. In further embodiments, the imaging device(s) 102 may correspond to any other suitable non-contact-based sensing device(s) configured to detect or capture image data or image-like data associated with the field material cloud(s), such as a stereographic camera(s), a radio detection and ranging (RADAR) sensor(s) or a light detection and ranging (LIDAR) sensor(s).

The imaging device(s) 102 may be installed at any suitable location(s) on the vehicle 10 and/or the implement 12. For example, in the embodiment shown in FIG. 2, one imaging device 102 is coupled to the forward frame 38 of the implement 12 such that its field of view 104 is directed to a portion of the field aft of one of the gangs 44 of the disk blades 46 mounted on the forward frame 38. In this respect, the imaging device 102 can capture image data associated with the field material cloud(s) being generated by such disk gang 44. However, in alternative embodiments, the imaging device(s) 102 may be installed at any other suitable location(s) on the vehicle 10 and/or the implement 12 that allows the imaging device(s) 102 to capture image data associated with the field material cloud(s) being generated by the ground-engaging tool(s) of the implement 12. Furthermore, the implement 10 may include any other suitable number of imaging device(s) 102, such as two or more imaging devices 102. For instance, in one embodiment, one imaging device 102 may be installed on the forward frame 38 adjacent to each disk gang 44.

Figure 3:
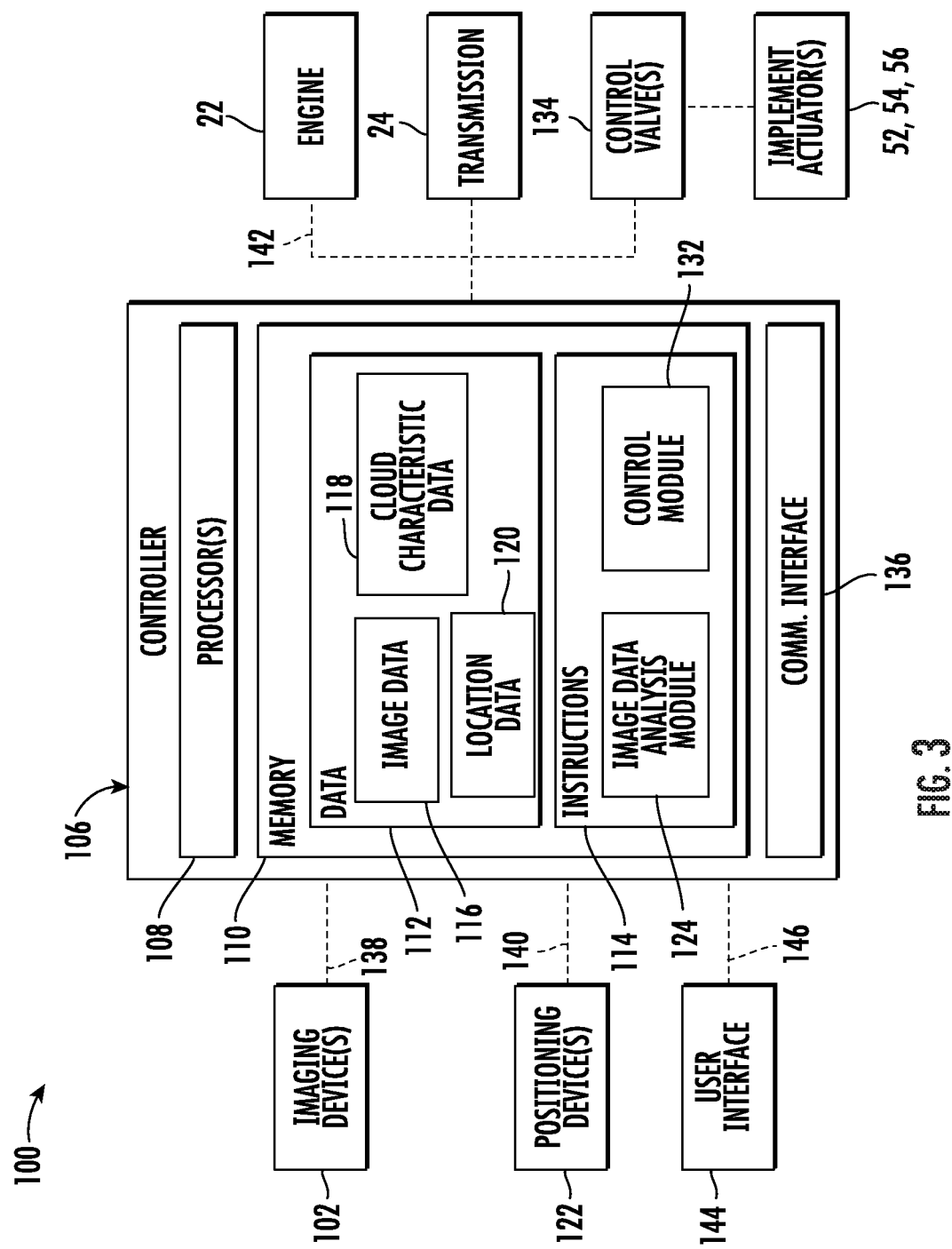
FIG. 3 illustrates a schematic view of one embodiment of a system for controlling the operation of an agricultural implement in accordance with aspects of the present subject matter.

Referring now to FIG. 3, a schematic view of one embodiment of a system 100 for controlling the operation of an agricultural implement is illustrated in accordance with aspects of the present subject matter. In general, the system 100 will be described herein with reference to the work vehicle 10 and the agricultural implement 12 described above with reference to FIGS. 1 and 2. However, it should be appreciated by those of ordinary skill in the art that the disclosed system 100 may generally be utilized with work vehicles having any other suitable vehicle configuration and/or implements having any other suitable implement configuration.

In several embodiments, the system 100 may include a controller 106 and various other components configured to be communicatively coupled to and/or controlled by the controller 106, such as one or more imaging devices 102 and/or various components of the work vehicle 10 and/or the implement 12. As will be described in greater detail below, the controller 106 may be configured to receive image data from the imaging device(s) 102 associated with the field material cloud(s) generated by one or more ground-engaging tools of the implement 12 as an operation (e.g., a tillage operation) is being performed within the field. Thereafter, the controller 106 may be configured to process/analyze the received image data to estimate or determine one or more characteristics of the field material cloud(s) depicted therein, such as the velocity, direction of travel, size, and/or shape of the field material units (e.g., the soil clods, the residue pieces, and/or the like) within the cloud(s). Additionally, based on the determined characteristic(s) of the field material cloud(s), the controller 106 may also be configured to adjust the operation of the work vehicle 10 and/or the implement 12, as necessary, to ensure that such characteristic(s) is maintained at a given target value and/or within a given target range.

In general, the controller 106 may correspond to any suitable processor-based device(s), such as a computing device or any combination of computing devices. Thus, as shown in FIG. 3, the controller 106 may generally include one or more processor(s) 108 and associated memory devices 110 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 110 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 110 may generally be configured to store information accessible to the processor(s) 108, including data 112 that can be retrieved, manipulated, created, and/or stored by the processor(s) 108 and instructions 114 that can be executed by the processor(s) 108.

In several embodiments, the data 112 may be stored in one or more databases. For example, the memory 110 may include an image database 116 for storing image data received from the imaging device(s) 102. For example, the imaging device(s) 102 may be configured to continuously or periodically capture image data associated with the field material cloud(s) generated by one or more ground-engaging tools of the implement 12 as an agricultural operation is being performed on the field. In such an embodiment, the data transmitted to the controller 106 from the imaging device(s) 102 may be stored within the image database 118 for subsequent processing and/or analysis. It should be appreciated that, as used herein, the term "image data" may include any suitable type of image-like data received from the imaging device(s) 102 that allows for a plurality of field material units within the field material cloud(s) to be identified and subsequently tracked and/or analyzed, including photographs, LIDAR data, RADAR data, and/or the like.

Additionally, as shown in FIG. 3, the memory 110 may include a cloud characteristic database 118 for storing information related to the characteristic(s) of the field material cloud(s) being generated by the ground-engaging tool(s) of the implement 12. For example, as indicated above, based on the image data received from the imaging device(s) 102, the controller 106 may be configured to estimate or determine the value(s) of one or more characteristics of the field material cloud(s) generated by the ground-engaging tool(s) of the implement 12 using one more image data processing techniques. The characteristic value(s) estimated or determined by the controller 106 may then be stored within the cloud characteristic database 118 for subsequent processing and/or analysis.

Moreover, in several embodiments, the memory 110 may also include a location database 120 storing location information about the vehicle/implement 10/12 and/or information about the field being processed (e.g., a field map). Specifically, as shown in FIG. 3, the controller 106 may be communicatively coupled to a positioning device(s) 122 installed on or within the work vehicle 10 and/or on or within the implement 12. For example, in one embodiment, the positioning device(s) 122 may be configured to determine the current location of the work vehicle 10 and/or the implement 12 using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 122 may be transmitted to the controller 106 (e.g., in the form coordinates) and subsequently stored within the location database 120 for subsequent processing and/or analysis.

Additionally, in several embodiments, the location data stored within the location database 120 may also be correlated to the images stored within the image database 116. For instance, in one embodiment, the location coordinates derived from the positioning device(s) 122 and the images captured by the imaging device(s) 102 may both be time-stamped. In such an embodiment, the time-stamped data may allow each image captured by the imaging device(s) 102 to be matched or correlated to a corresponding set of location coordinates received from the positioning device(s) 122, thereby allowing the precise location of the portion of the field at which a given image was captured to be known (or at least capable of calculation) by the controller 106.

Moreover, by matching each image to a corresponding set of location coordinates, the controller 106 may also be configured to generate or update a corresponding field map associated with the field being processed. For example, in instances in which the controller 106 already includes a field map stored within its memory 110 that includes location coordinates associated with various points across the field, the characteristic value(s) of the field material cloud(s) determined from each image captured by the imaging device(s) 102 may be mapped or correlated to a given location within the field map. Alternatively, based on the location data and the associated image data, the controller 102 may be configured to generate a field map for the field that includes the geo-located image data associated therewith.

Referring still to FIG. 3, in several embodiments, the instructions 114 stored within the memory 110 of the controller 106 may be executed by the processor(s) 108 to implement an image data analysis module 124. In general, the image data analysis module 124 may be configured to analyze the image data received by the imaging device(s) 102 using one or more image data processing techniques to allow the controller 106 to estimate or determine the value(s) of one or more characteristics of the field material cloud(s) being generated by the ground-engaging tool(s) of the implement 12 as the implement 12 is towed across the field. Specifically, in several embodiments, the image data analysis module 124 may be configured to implement one or more image data processing techniques that allow the controller 106 to identify a plurality of field material units (e.g., soil clods, residue pieces, rocks, and/or the like) of the field material cloud(s) depicted within each image (or within a subset of the images). For example, in one embodiment, the image data analysis module 124 may be configured to implement one or more blob detection techniques to allow the controller 106 to identify a plurality of the field material units of the field material cloud(s) as "blobs" within each image. As will be described below, after identifying the field material units present within each image, the controller 106 may be configured to determine one or more characteristics of such field material units.

It should be appreciated that the image data analysis module 124 may be configured to implement any suitable image processing techniques that allow the controller 106 to identify a plurality of the field material units of the field material cloud(s) present within each image (or subset of images). As mentioned above, the image data analysis module 124 may be configured to implement a blob detection technique(s) to allow the controller 106 to identify the field material units. Such blob detection technique(s) may include the Laplacian of Gaussian (LoG) technique, the Difference of Gaussians (DoG) technique, the Determinant of Hessian (DoH) technique, the Maximally Stable Extremal Regions technique, and/or the like. However, in alternative embodiments, the image data analysis module 124 may be configured to implement any other suitable image data analysis technique(s) to allow the controller 106 to identify the field material units of the field material cloud(s) depicted within the received image data, such as an optical flow technique(s), an edge detection technique(s), and/or the like. Additionally, in some embodiments, the image data analysis module 124 may be configured to implement one or more machine learned models to allow the controller 106 to identify the field material units, such as a neural network (e.g., a convolution neural network), a clustering model (e.g., a hierarchical clustering model), and/or the like.

Moreover, it should be appreciated that the image data analysis module 124 may allow the controller 106 to identify any suitable type of field material units present within the field material cloud(s) depicted within the images captured by the imaging device(s) 102. For example, such field material units may include soil clods, residue pieces, and/or rocks. However, in alternative embodiments, the image data analysis module 124 may allow the controller 106 to identify any other suitable types of field material units present within the field material cloud(s).

Additionally, the image data analysis module 124 may be configured to determine one or more characteristics associated with the identified plurality of field material units. Specifically, in one embodiment, the image data analysis module 124 may be configured to implement any suitable image processing techniques that allow the controller 106 to track each of the identified field material units across of plurality of successive images. In this respect, by tracking the field material units across successive images, the controller 106 may be able to determine or estimate a velocity and/or a direction of travel of the identified field material units within the field material could(s). Alternatively, or in addition to determining the velocity and/or direction of travel of the field material units, the image data analysis module 124 may be configured to implement any suitable image processing techniques that allow the controller 106 to determine or estimate the size and/or the shape of the identified field material units (e.g., by determining the size and/or shape of "blobs" identified in the received image data. However, in alternative embodiment, the controller 106 may be configured to determine any other suitable characteristic(s) or parameter(s) associated with the identified field material units. As will be described below, the identified characteristics of the field material units may be indicative of the performance of the agricultural operation being performed by the implement 12.

Figure 4:
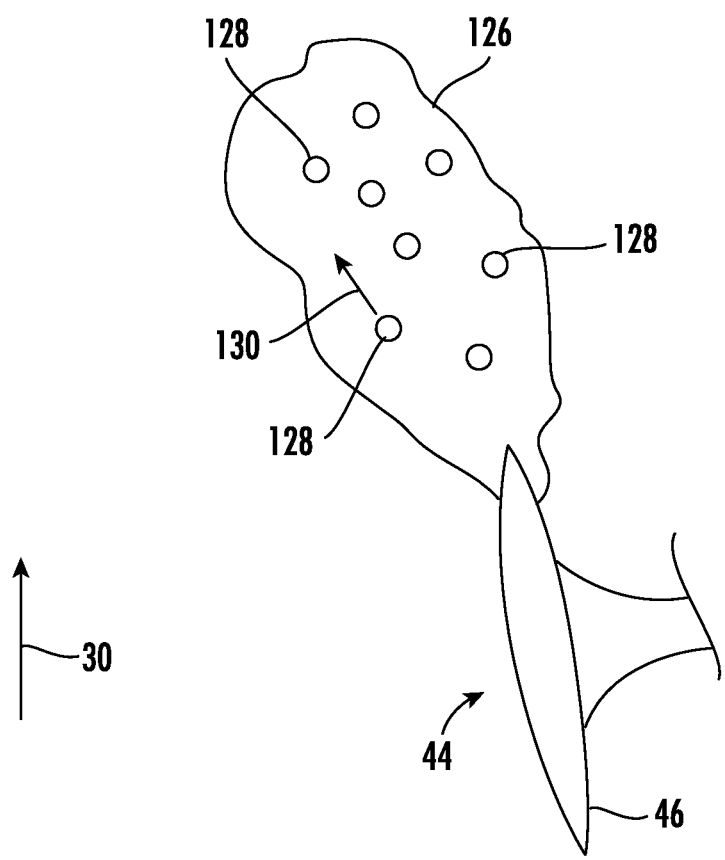
FIG. 4 illustrates a top view of an example field material cloud generated by a ground-engaging tool of an agricultural implement in accordance with aspects of the present subject matter.

FIG. 4 illustrates a top view of an example field material cloud 126 being generated by a disk blade 46 of the implement 12 in accordance with aspects of the present subject matter. As mentioned above, when the implement 12 is moved across the field to perform an agricultural operation (e.g., a tillage operation) thereon, one or more ground-engaging tools of the implement 12 may generate a field material cloud(s) (informally known as a "rooster tail") aft of such tool(s). The field material cloud(s) may, in turn, be formed from the field materials, such as soil, residue, dust, rocks, and/or the like, that are lifted into the air or otherwise become airborne as the ground-engaging tool(s) are moved through the soil. For example, in certain instances, as shown in FIG. 4, the laterally outermost disk blade 46 mounted on each of the gangs 44 (one is shown) may generate a corresponding field material cloud 126. Each field material cloud 126 may, in turn, extend rearward and laterally outward (i.e., away from the centerline of the implement 12) from the corresponding disk blade 46. As shown, the field material clouds 126 may formed from field material units 128 (e.g., soil clods, residue pieces, and/or the like) that are lifted into the air by the disk blades 46 and thrown rearward and laterally outward from the disk blades 46. In this respect, as described above, the image data analysis module 124 may be configured to allow the controller 106 to identify a plurality of the field material units 128 of the field material clouds 126 depicted within the received image data and determine one or more characteristics of the identified field material units 128. For example, as mentioned above, in one embodiment, the controller 106 may be configured to determine a direction of travel (e.g., as indicated by arrow 130 in FIG. 4) of the identified field material units 128 relative to the direction of travel 30 of the vehicle/implement 10/12.

Referring again to FIG. 3, the instructions 114 stored within the memory 110 of the controller 106 may also be executed by the processor(s) 108 to implement a control module 132. In general, the control module 132 may be configured to adjust the operation of the work vehicle 10 and/or the implement 12 by controlling one or more components of the implement/vehicle 12, 10. Specifically, in several embodiments, the control module 136 may be configured to adjust one or more operating parameters of the vehicle 10 and/or the implement 12 based on the determined field material unit characteristic(s). For example, in one embodiment, when the field material unit characteristic(s) determined by the controller 106 falls outside of an associated predetermined range, the control module 132 may be configured to fine-tune the operation of the work vehicle 10 and/or the implement 12 in a manner designed to adjust the characteristic(s) of the field material units present within the field material cloud(s). Additionally, the predetermined range may be set or selected from a plurality of predetermined ranges based on the ground speed of the vehicle/implement 10/12, the engagement depth of the ground-engaging tool(s) (e.g., the penetration depth of disk blades 46 as detected by an associated sensor(s)), the types of ground-engaging tool(s) (e.g., the type of disk blades 46 as determined based on operator input). For example, in one embodiment, the controller 106 may be configured to adjust the predetermined range(s) when the operator provides an input indicated that he/she changed from smooth disk blades to crimpled/wave disk blades. However, in alternative embodiments, the predetermined range may be set or selected based on any other suitable operating parameters of the vehicle 10 and/or the implement 12 and/or based on any suitable field condition parameters.

It should be appreciated that the controller 106 may be configured to implement various control actions to adjust the operation of the work vehicle 10 and/or the implement 12 in a manner that adjusts the characteristic(s) of the field material cloud(s). In one embodiment, the controller 106 may be configured to increase or decrease the operational or ground speed of the implement 12 to affect a change in the characteristic(s) of the characteristic(s) of the field material cloud(s). For instance, as shown in FIG. 3, the controller 106 may be communicatively coupled to both the engine 22 and the transmission 24 of the work vehicle 10. In such an embodiment, the controller 106 may be configured to adjust the operation of the engine 22 and/or the transmission 24 in a manner that increases or decreases the ground speed of the work vehicle 10 and, thus, the ground speed of the implement 12, such as by transmitting suitable control signals for controlling an engine or speed governor (not shown) associated with the engine 22 and/or transmitting suitable control signals for controlling the engagement/disengagement of one or more clutches (not shown) provided in operative association with the transmission 24.

In addition to the adjusting the ground speed of the vehicle/implement 10/12 (or as an alternative thereto), the controller 106 may also be configured to adjust one or more operating parameters associated with the ground-engaging tools of the implement 12. For instance, as shown in FIG. 3, the controller 106 may be communicatively coupled to one or more valves 134 configured to regulate the supply of fluid (e.g., hydraulic fluid or air) to one or more corresponding actuators 52, 54, 56 of the implement 12. In such an embodiment, by regulating the supply of fluid to the actuator(s) 52, 54, 56, the controller 106 may automatically adjust the penetration depth of, the angle/orientation of, the force being applied to, and/or any other suitable operating parameter associated with the ground-engaging tools of the implement 12. For example, in one embodiment, when it is determined that the characteristic(s) of the field material cloud(s) has exceeded the predetermined range (thereby indicating that an operating parameter of the vehicle/implement 10/12 may need to be adjusted), the controller 106 may be configured to control the valve(s) 134 in a manner that changes the penetration depth of, the angle/orientation of, and/or the force being applied to disk gangs 44 by the actuators 54.

Moreover, as shown in FIG. 3, the controller 106 may also include a communications interface 136 to provide a means for the controller 106 to communicate with any of the various other system components described herein. For instance, one or more communicative links or interfaces 138 (e.g., one or more data buses) may be provided between the communications interface 136 and the imaging device(s) 102 to allow images transmitted from the imaging device(s) 102 to be received by the controller 106. Similarly, one or more communicative links or interfaces 140 (e.g., one or more data buses) may be provided between the communications interface 136 and the positioning device(s) 122 to allow the location information generated by the positioning device(s) 122 to be received by the controller 106. Additionally, as shown in FIG. 3, one or more communicative links or interfaces 142 (e.g., one or more data buses) may be provided between the communications interface 136 and the engine 22, the transmission 24, the control valves 134, and/or the like to allow the controller 106 to control the operation of such system components.

Furthermore, in one embodiment, the system 100 may also include a user interface 144. More specifically, the user interface 144 may be configured to provide feedback (e.g., feedback associated with the determined characteristic(s) of the field material cloud(s) being generated by the ground-engaging tool(s) of the implement 12) to the operator of the vehicle/implement 10/12. As such, the user interface 144 may include one or more feedback devices (not shown), such as display screens, speakers, warning lights, and/or the like, which are configured to provide feedback from the controller 106 to the operator. The user interface 144 may, in turn, be communicatively coupled to the controller 106 via a communicative link or interface 146 to permit the feedback to be transmitted from the controller 106 to the user interface 144. In addition, some embodiments of the user interface 144 may include one or more input devices (not shown), such as touchscreens, keypads, touchpads, knobs, buttons, sliders, switches, mice, microphones, and/or the like, which are configured to receive user inputs from the operator. In one embodiment, the user interface 144 may be mounted or otherwise positioned within the cab 20 of the vehicle 10. However, in alternative embodiments, the user interface 144 may be mounted at any other suitable location.

Figure 5:
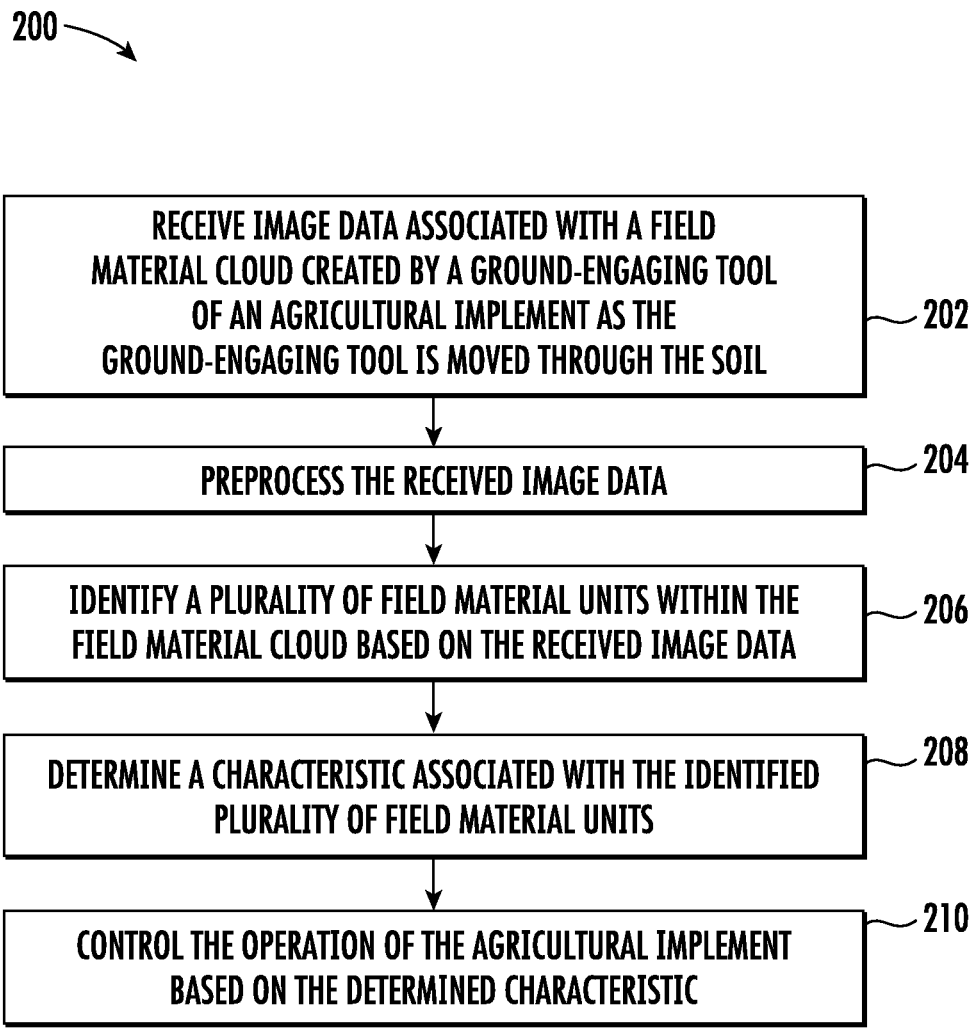
FIG. 5 illustrates a flow diagram of one embodiment of a method for controlling the operation of an agricultural implement in accordance with aspects of the present subject matter.

Referring now to FIG. 5, a flow diagram of one embodiment of a method 200 for controlling the operation of an agricultural implement is illustrated in accordance with aspects of the present subject matter. In general, the method 200 will be described herein with reference to the work vehicle 10 and agricultural implement 12 shown in FIGS. 1 and 2, as well as the various system components shown in FIGS. 3 and 4. However, it should be appreciated that the disclosed method 200 may be implemented with work vehicles having any other suitable vehicle configuration, implements having any other suitable implement configuration, and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving image data associated with a field material cloud created by a ground engaging tool of an agricultural implement as the ground engaging tool is moved through the soil. As described above, the vehicle/implement 10/12 may include one or more imaging devices 102 (e.g., a camera(s)), with each imaging device 102 configured to capture image data associated with one or more field material clouds being generated by one or more ground-engaging tools (e.g., the disk blade(s) 46) of the implement 12. In this regard, as the vehicle/implement 10/12 travels across the field to perform an agricultural operation thereon (e.g., a tillage operation), the controller 106 may be configured to receive the captured image data from the imaging device(s) 102 (e.g., via the communicative link 138). As will be described below, the controller 106 may be configured to analyze the received image data to identify a plurality of field material units of the field material cloud(s) depicted therein and subsequently determine one or more characteristics of the identified field material units.

Furthermore, at (204), the method 200 may include pre-processing the received image data. Specifically, in several embodiments, the image data analysis module 124 of the controller 106 may be configured to preprocess or otherwise precondition the received image data. For example, in embodiments in which the received image data corresponds to RADAR or LIDAR data, the image data analysis module 124 of the controller 106 may be configured to generate an image-like representation of the field material cloud(s) based on the received RADAR or LIDAR data. The generated representation may, in turn, allow the image data analysis module 124 to identify a plurality of field material units of the field material cloud(s) within the representation and determine one or more characteristics of the such field material units.

Additionally, as shown in FIG. 5, at (206), the method 200 may include identifying a plurality of field material units with the field material cloud based on the received image data. Specifically, as indicated above, the image data analysis module 124 of the controller 106 may, in accordance with aspects of the present subject matter, be configured to implement one or more suitable image data analysis techniques (e.g., a blob detection technique(s)) that allows the controller 106 to identify a plurality of field material units (e.g., soil clods, residue pieces, and/or the like) of the field material cloud(s) depicted within the received image data.

Moreover, at (208), the method 200 may include determining a characteristic associated with the identified plurality of field material units. Specifically, in several embodiments, the image data analysis module 124 may be configured to implement one or more suitable image data processing techniques that allow the controller 106 to track the identified field material units across a plurality of images. In such an embodiment, the controller 106 may be configured to determine or estimate the velocity and/or the direction of travel of the identified field material units. Alternatively, or in addition to determining the velocity and/or direction of travel of the identified field material units, the image data analysis module 124 may be configured to implement one or more suitable image data processing techniques that allow the controller 106 to determine or estimate the size(s) and/or shape(s) of such field material units.

In addition, at (210), the method 200 may include controlling the operation of the agricultural implement based on the determined characteristic(s) of the identified field material units. In general, the control module 132 of the controller 106 may be configured to adjust one or more operating parameters of the vehicle 10 and/or the implement 12, such as ground speed of the vehicle/implement 10/12 and/or the penetration depth of, the angle/orientation of, and/or the force(s) applied to the ground-engaging tool(s) (e.g., the disk gangs 44) of the implement 12, in a manner that adjusts characteristic(s) of the identified field material units within the field material cloud(s). Specifically, in several embodiments, the controller 106 may be configured to compare the determined field material unit characteristic(s) of the field material cloud(s) to an associated predetermined range. Thereafter, when the determined field material unit characteristic(s) falls outside of the predetermined range, the control module 132 may be configured to adjust the operating parameter(s) of the vehicle 10 and/or the implement 12 in a manner that adjusts such characteristic/condition of the field. For example, in certain instances, when the velocity of the field material units is too great and/or an angle defined between the direction of travel of the field material units and the direction of travel 30 of the vehicle/implement 10/12 is too great, it may be necessary to reduce the speed of the implement 12. In such instances, the control module 132 may be configured to control the operation of the engine 22 and/or the transmission 24 in a manner that reduces the ground speed of the vehicle/implement 10/12. Furthermore, when the sizes of the field material units are too great (thereby indicating that the disk blades 46 are too deep to sufficiently break up the field materials), it may be necessary to reduce the penetration depth of the disk blades 46. In such an embodiment, the control module 132 may be configured to control the operation of the actuators 54 in a manner that reduces the penetration depth of the disk blades 46.

Moreover, in several embodiments, at (210), the method 200 may include providing a notification to the operator of the vehicle/when the determined characteristic(s) of the identified field material units falls outside of an associated predetermined range. Specifically, the controller 106 may configured to transmit instructions to the user interface 144 (e.g., the communicative link 146). Such instructions may, in turn, instruct the user interface 144 to provide a notification to the operator of the vehicle/implement 10/12 (e.g., by causing a visual or audible notification or indicator to be presented to the operator) that provides an indication that the determined characteristic(s) of the identified field material units has fallen outside of the associated predetermined range. In such instances, the operator may then choose to initiate any suitable corrective action he/she believes is necessary to adjust the characteristic(s) of the field material clouds(s) (to the extent such control action(s) is necessary), such as adjusting the ground speed of the implement 12.

It is to be understood that the steps of the method 200 are performed by the controller 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 106 described herein, such as the method 200, is implemented in software code or instructions which are tangibly stored on a tangible computer readable medium. The controller 106 loads the software code or instructions via a direct interface with the computer readable medium or via a wired and/or wireless network. Upon loading and executing such software code or instructions by the controller 106, the controller 106 may perform any of the functionality of the controller 106 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the operation of an agricultural implement, the system comprising:
   a ground-engaging tool configured to engage soil within a field such that the ground-engaging tool creates an airborne field material cloud formed of field materials that have been lifted into the air aft of the ground-engaging tool as the agricultural implement is moved across the field;
   an imaging device configured to capture image data associated with the airborne field material cloud created by the ground-engaging tool; and
   a controller communicatively coupled to the imaging device, the controller including a processor and associated memory, wherein the controller:

identifies a plurality of field material units within the airborne field material cloud based on the image data captured by the imaging device as the agricultural implement is moved across the field; and determine determines a characteristic of the identified plurality of field material units within the airborne field material cloud.

2. The system of claim 1, wherein the characteristic comprises a velocity of the plurality of field material units.

3. The system of claim 1, wherein the characteristic comprises a direction of travel of the plurality of field material units.

4. The system of claim 1, wherein the characteristic comprises at least one of a size or a shape of the plurality of field material units.

5. The system of claim 1, wherein the controller is further configured to control an operation of the agricultural implement based on the determined characteristic.

6. The system of claim 5, wherein, when controlling the operation of the agricultural implement, the controller is further configured to:

compare the determined characteristic to a predetermined characteristic value range; and when the determined characteristic falls outside of the determined characteristic value range, initiate an adjustment to an operating parameter of the agricultural implement.

7. The system of claim 6, wherein, when the determined characteristic falls outside of the predetermined characteristic value range, the controller is further configured to provide a notification to an operator of the agricultural implement.

8. The system of claim 6, wherein the predetermined characteristic value range is based on a ground speed of the agricultural implement.

9. The system of claim 6, wherein the operating parameter of the agricultural implement comprises a ground speed of the agricultural implement.

10. The system of claim 6, wherein the operating parameter of the agricultural implement comprises at least one of a force being applied to the ground-engaging tool, a penetration depth of the ground-engaging tool, or an orientation of the ground-engaging tool.

11. The system of claim 1, wherein the ground-engaging tool comprises a disk blade.

12. The system of claim 1, wherein the imaging device comprises a camera.

13. A method for controlling the operation of an agricultural implement, the agricultural implement including a ground-engaging tool configured to engage soil within a field as the agricultural implement is moved across the field, the method comprising:

receiving, with one or more computing devices, image data associated with an airborne field material cloud formed of field materials that have been lifted into the air by the ground-engaging tool as the agricultural implement is moved across the field;

identifying, with the one or more computing devices, a plurality of field material units within the airborne field material cloud based on the received image data;

determining, with the one or more computing devices, a characteristic of the identified plurality of field material units within the airborne field material cloud; and controlling, with the one or more computing devices, an operation of the agricultural implement based on the determined characteristic.

14. The method of claim 13, wherein the characteristic comprises a velocity of the plurality of field material units.

15. The method of claim 13, wherein the characteristic comprises a direction of travel of the plurality of field material units.

16. The method of claim 13, wherein the characteristic comprises at least one of a size or a shape of the plurality of field material units.

17. The method of claim 13, wherein controlling the operation of the agricultural implement further comprises:

comparing, with the one or more computing devices, the determined characteristic to predetermined characteristic value range; and when the determined characteristic falls outside of the predetermined characteristic value range, initiating, with the one or more computing devices, an adjustment to an operating parameter of the agricultural implement.

18. The method of claim 17, wherein the operating parameter of the agricultural implement comprises a ground speed of the agricultural implement.

19. The method of claim 17, wherein the operating parameter of the agricultural implement comprises at least one of a force being applied to the ground-engaging tool, a penetration depth of the ground-engaging tool, or an orientation of the ground-engaging tool.

20. The method of claim 17, wherein the predetermined characteristic value range is based on a ground speed of the agricultural implement.

* * * * *